United States Patent [19]

Dulude

[11] 4,132,000

[45] Jan. 2, 1979

[54] APPARATUS AND METHOD FOR MAKING GUN TARGETS

[76] Inventor: Charles R. Dulude, 33 Burnside Ave., East Hartford, Conn. 06108

[21] Appl. No.: 766,716

[22] Filed: Feb. 8, 1977

[51] Int. Cl.² .............................................. G01B 3/14
[52] U.S. Cl. ................................ 33/174 B; 33/174 G
[58] Field of Search ........... 33/174 B, 174 G, DIG. 9

[56] References Cited

U.S. PATENT DOCUMENTS

| | | | |
|---|---|---|---|
| 2,500,873 | 3/1950 | Sager | 33/174 B |
| 3,124,997 | 3/1964 | Morton | 33/174 B |

FOREIGN PATENT DOCUMENTS 2002132  10/1969  France ................................... 33/174 B

*Primary Examiner*—Richard E. Aegerter
*Assistant Examiner*—Willis Little
*Attorney, Agent, or Firm*—Lawrence A. Cavanaugh

[57] ABSTRACT

An apparatus for the generation of rifle targets for load development and accuracy testing of scope assisted rifles is disclosed in which the rifle targets have sighting areas optimized for a particular scope. The apparatus comprises a base having a first axis and a second axis orthogonal to the first axis, a plurality of apertures in the base for forming the sighting areas on the target, pilot means within the base for successively positioning the apertures to form the sighting areas and lines of space control disposed about the pilot means for optimizing the dimensions of the sighting areas. The present invention is utilized to generate rifle targets having sighting areas with dimensions optimized to the power of the scope and the width of the cross hairs. An embodiment of the present invention is capable of generating targets having sighting areas with dimensions optimized by the size of the dot reticle of the scope.

13 Claims, 8 Drawing Figures

APPARATUS AND METHOD FOR MAKING GUN TARGETS

BACKGROUND OF THE INVENTION.

1. Field of Invention

The present invention relates to gun targets and more particularly to a device and method for generating targets matched to a particular scope.

2. Description of the prior art

The proper utilization of a scope on a rifle requires the scope to be adjusted for both windage and elevation corrections. Shot grouping on a target requires an optimization between the scope power, lighting conditions, rifle to target distance, muzzle velocity of the load, weight of the load, angle of inclination of the muzzle with the line of sight, angle of inclination of the scope with the rifle line of sight, windage adjustment of the scope, shooter's eyesight as well as the type of scope reticles such as cross hairs, posts, duplex, CPC, post plus duplex, dot, etc. and various combinations.

A present method of shot grouping is to use the conventional bulls eye targets. The rifle is aimed at the target and fired several times to obtain a grouping. For a particular load and rifle to target distance, the scope is adjusted to optimize the grouping. However, no compensation is made for the type of reticle of the scope, width of the cross hairs, lighting, eyesight, etc. Also, the target dimensions are not changed.

Another method is the use of multiple squares on a target. The shots are grouped into a particular square. While the approach allows the optimization of more variations than the use of a bull's eye target, complete optimization of all of the factors influencing the matching of a scope-target combination is not obtained.

SUMMARY OF THE INVENTION

An object of the present invention is the generation of rifle targets for load development and accuracy testing of scope assisted rifles.

Another object of the present invention is the generation of rifle targets having sighting areas optimized for a particular scope.

According to the present invention, there is provided an apparatus for making gun targets comprising a base having a first axis and a second axis orthogonal to the first axis, a plurality of apertures in the base, said apertures having a first side parallel to the first axis and a second side orthogonal to the first side and parallel to the second axis, said first side and second side being equidistant from the first axis and the second axis respectively, pilot means for successively positioning an aperture to form a sighting area, and means for optimizing the dimensions of the sighting areas, said means being symmetrically positioned around the pilot means.

A feature of the present invention is the symmetric positioning of the pilot means for obtaining sighting areas. Also, the symmetrical spacing of the means for optimizing the dimension of the sighting areas about each of the pilot means controls the dimension of the sighting area. Further, the size of each aperture is inversely proportional to the power of a rifle scope. Also, the geometrical center of each aperture is positioned equidistant from from a pair of orthogonal axis drawn through the center of the base. Further, the distance from the geometrical center of each aperture to the orthogonal axis decreases as the size of the aperture decreases. Another feature is the symmetrical location of the geometrical center of each pilot means on each of the orthogonal axis.

An advantage of the present invention is the ability to generate targets having sighting areas with dimensions optimized to the power of the scope. Another is the ability to match the target dimensions to the reticle figuration on the scope. Also, the sighting areas on the target can be dimensioned to match the reticle size. The target configurations can also be optimized for variations in the target to scope distance.

These, together with other features, objects, and advantages of the present invention will be more readily understood from the following description when taken in connection with the accompanying drawings wherein:

DESCRIPTION OF THE PREFERRED EMBODIMENT

Figure 1:
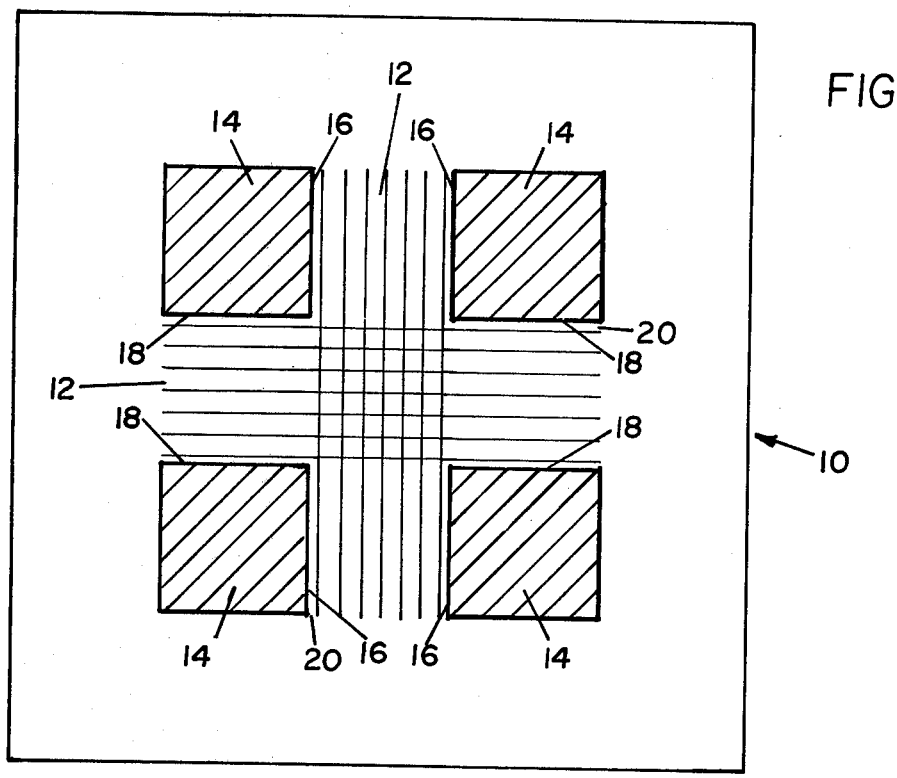
FIG. 1 shows a rifle target on which a scope cross hair has been superimposed.

Referring now to the figure and more particularly to FIG. 1 which shows a view of a target 10 for shot grouping in which a scope cross hair 12 has been superimposed. A rectangular square 14 located at each corner of the target, has a vertical side 16 and a horizontal side 18 which are mutually orthogonal and define the target sighting area which is the cross area between the squares. The separation between the horizontal sides of adjacent squares is equal to the separation between the vertical sides of adjacent squares. A small slit 20 exists between the cross hairs 12 and the horizontal and vertical sides of the squares.

To obtain good shot groups on a target, the target must be designed for a particular scope power, scope reticle, scope to target distance, eyesight, etc. A good criteria for a properly optimized target is to have only a small slit between the vertical and horizontal side of the square and the superimposed cross hair. When this occurs, the scope and the target have been matched for the particular distance, eyesight, cross hair, scope power, etc. Good shot groups should then be obtained.

Elevation and windage adjustments on the scope can then be made to position the grouped shots at a particular location on the target. FIG. 1 shows an example of a target having a sighting area matched to a particular scope power, etc. Since the rifle scope cross hairs, scope power, scope to target distance, eyesight, etc. are usually fixed, the only variable which can be adjusted to optimize the scope to target relationship is the width of the sighting area on the target, i.e. the area enclosed by the squares. The width of the cross hairs on a variable power scope will increase as the scope power is decreased and some adjustments can be made with variable power scopes to optimize the scope to target perimeters. Also these scopes have parallax adjustments on the 8x and higher power ranges.

Figure 2:
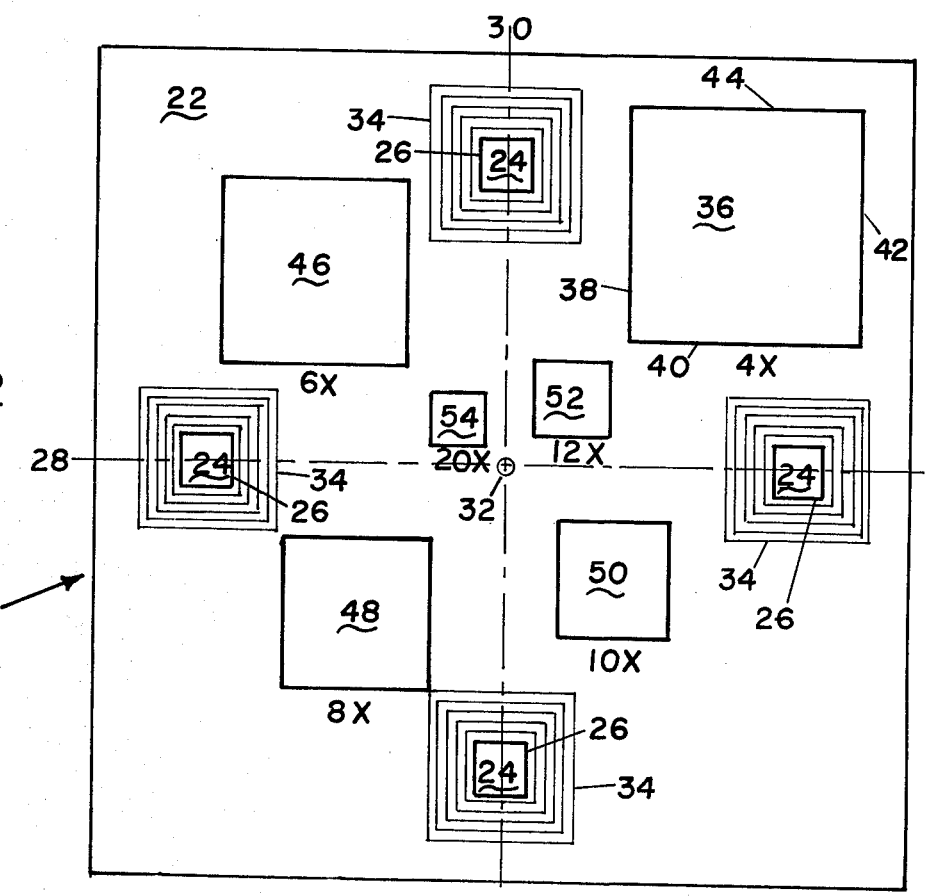
FIG. 2 shows the present invention for making targets for use with scopes having cross hair reticles.

FIG. 2 shows the apparatus 21 of the present invention which is a device for generating targets having an optimum width of the sighting area. The apparatus has a base 22 generally made of clear plastic material, having a thickness varying from 0.01 to 0.100 inches. Pilot holes 24 having sides 26 of equal length are located on a pair of orthogonal axis such as a horizontal axis 28 and a vertical axis 30. The pilot holes are located equidistant from one another and are all equidistant from a geometrical center 32 of the base.

A plurality of lines of space control 34 are symmetrically disposed about the sides of the pilot holes. First aperture 36 having a first boundary 38, a second boundary 40, a third boundary 42, a fourth boundary 44, all of said boundaries having equal lengths, is located in the base with the first boundary 38 having a parallel relationship to the vertical axis 30 and the second boundary 40 having a parallel relationship to the vertical axis 28. The separation between the horizontal axis and the second boundary is equal to the separation between the vertical axis and the first boundary.

A second aperture 46, a third aperture 48, a fourth aperture 50, a fifth aperture 52 and a sixth aperture 54 are disposed about the axis of the base having one boundary in a parallel relationship with the vertical axis and an adjacent orthogonal boundary in a parallel relationship with the horizontal axis, said boundaries being separated from their respective parallel axis by equal distances.

Each of the apertures 36, 46, 48, 50, 52 and 54 has a different dimension, each dimension corresponding to a specific power of a scope. As shown, the first aperture 36 is dimensioned for a 4x scope, the second aperture 46 for a 6x scope, the third aperture 48 for an 8x scope, the fourth aperture 50 for a 10x scope, the fifth aperture 52 for a 12x scope, and the sixth aperture 54 for a 20x scope. The dimensions are all approximate for a scope to target distance of 100 yards. It is to be understood that a different scope to target distance will usually require different aperture dimensions. The distance between the vertical and the horizontal axis and the boundaries of the apertures become less as the scope power increases such that the higher the scope power, the closer the corresponding aperture is to the geometric center 32 of the base. Also, as the scope power increases, the size of the corresponding aperture decreases. As the power of the scope increases, the separation between adjacent squares 14 as shown in FIG. 1 decreases and the size of the box may also be decreased to provide greater definition on the target.

Figure 3:
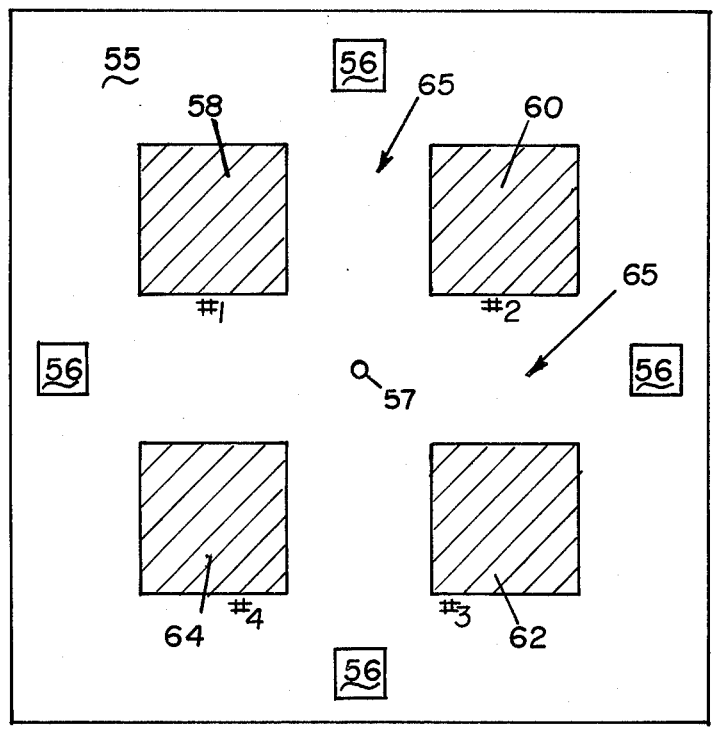
FIG. 3 shows the steps in generating a target.

The utilization of the present invention in the generation of targets for group shooting is shown in FIG. 3. The apparatus is placed over a blank sheet of target material 55 and four pilot hole traces 56 are made using a pencil or any marking means to trace the sides of the pilot holes. Care must be exercised to make these traces accurate as any misalignment will cause inaccuracies in the completed target. An aperture is then selected corresponding to the power of the particular scope for which the target is being made. For this illustration the third aperture 48 of FIG. 2 is utilized corresponding to an 8x scope.

The four pilot hole traces 56 are aligned with the pilot holes 24 and a first square 58 is made in position #1 on the target using the boundaries of the third aperture as a guide in making the first square. The apparatus is then rotated clockwise 90 degrees, the pilot holes are again aligned over the traces and second square 60 is made. The apparatus is again rotated clockwise 90 degrees, the pilot holes again aligned, and a third square 62 is made in position #3. The process is repeated to obtain a fourth square 64 in position #4.

It is to be understood that counter clockwise rotation of the apparatus will generate the same target. The squares can be colored to improve the contrast.

The set of four squares define the boundaries of the target. The section of the target used to align a scope is the sighting area 65 between the squares. The squares in FIG. 3 are used only to define the sighting area and to provide a background to better define the sighting area. The pilot hole traces are used only to generate the target and are not utilized as part of the target.

Figure 4:
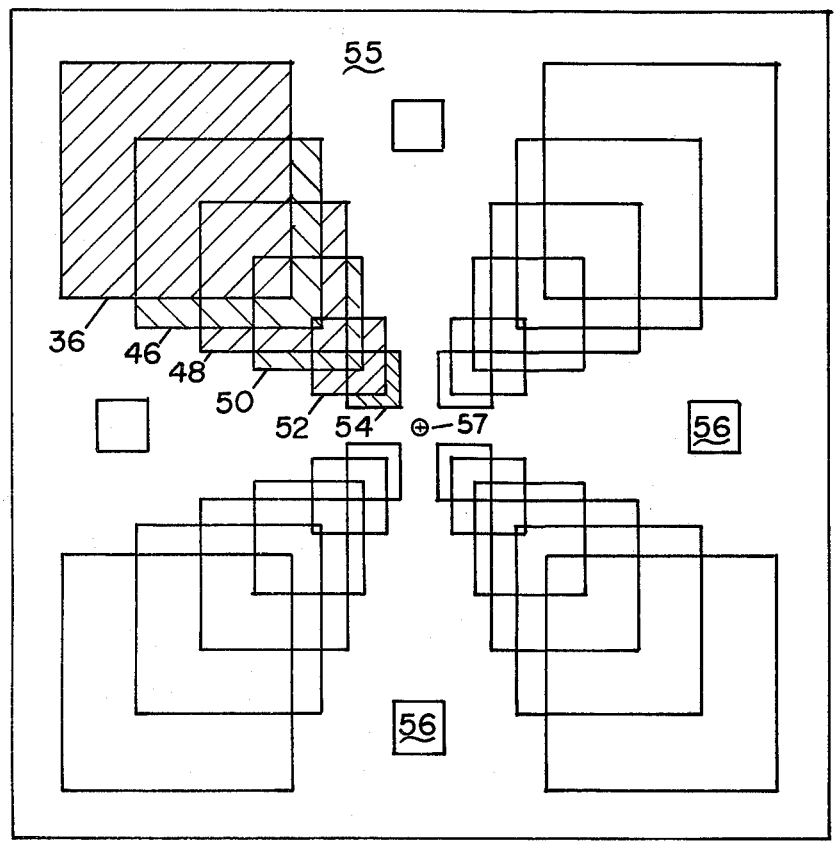
FIG. 4 shows a target produced using the present invention in which the sighting areas corresponding to several scope powers have been superimposed.

FIG. 4 shows a target having sighting areas corresponding to six different scope powers which are superimposed on one another. The target was produced with the apparatus as shown in FIG. 2 according to the method described in conjunction with FIG. 3 for each of the apertures, and the squares are numbered corresponding to the apertures as labeled in FIG. 2. As can be seen from FIG. 4, the separation between like squares increases as the power of the scope decreases. As stated previously, the pilot hole trace 56 is used only to generate the target and is neglected in the use of the target.

In operation, a target such as shown in FIG. 4 could be utilized to determine an approximate sighting area dimension for a particular scope power, scope to target distance, lighting, etc. The target is placed at the required shooting distance and sighted with the scope. A sighting area approximating the scope cross hair dimension is selected and the corresponding aperture size is identified. The dimension of the scope cross hair can be greater than or less than the dimension of the sighting area. The lines of space control 34 as shown in FIG. 2 are then utilized to optimize the dimension of the sighting area to the width of the scope cross hairs as superimposed on the target.

Figure 5:
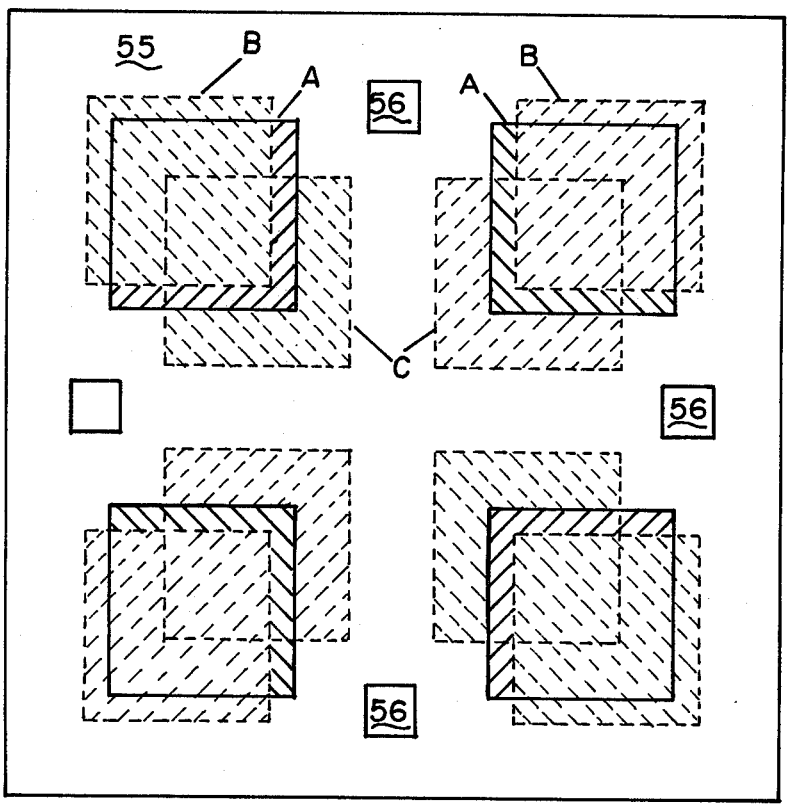
FIG. 5 shows the variations in the target sighting areas produced using the lines of space control.

FIG. 5 shows a target obtained in accordance with the present invention in which the lines of space control have been utilized to vary the width of the sighting area. A target is initially generated according to the method disclosed herein having the square positioned in location A. The lines of space control are used to change the width of the sighting areas by forming the squares in position B to increase the sighting area width or in position C to decrease the width. As noted previously, the width of the sighting area is adjusted to optimize the target for a particular scope power, lighting conditions, scope to target distance, etc.

Figure 6:
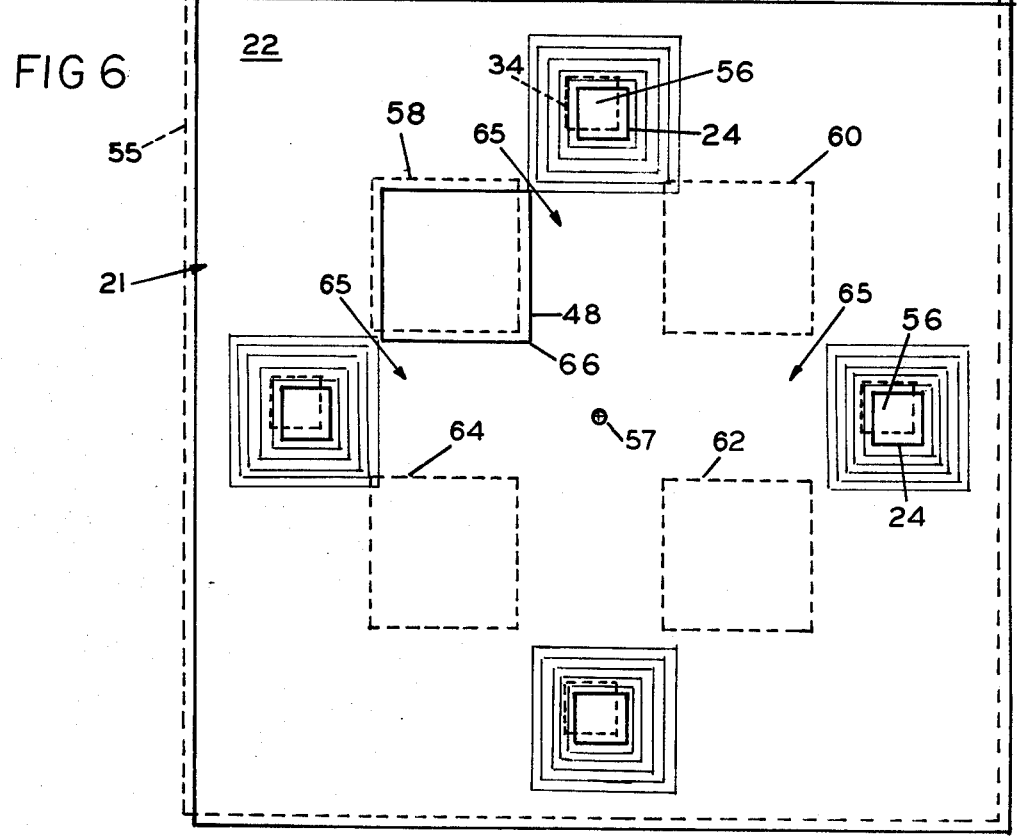
FIG. 6 shows the steps of varying the dimensions of the target sighting area using the space control lines.

FIG. 6 shows the target 55 of FIG. 3 represented by dashed lines on which the apparatus 21 of the present invention has been superimposed. For illustration purposes, only one aperture of the apparatus is shown to facilitate the understanding of the use of the lines of space control. The aperture shown in FIG. 6 is the third aperture 48 of the apparatus.

The apparatus 21 of the present invention is positioned on the target 55 such that a line of space control 34 is superimposed on the boundary of the pilot hole trace 56 and a corner 66 of the third aperture 48 has been moved in a direction toward the geometric center 57 of the target 55. This position will decrease the width of the sighting area. It is to be noted that the same line of space control around each pilot hole 24 is superimposed on the boundary of each of the pilot hole traces 56. Also, the width of the sighting area 65 can be increased by superimposing the lines of space control on th boundary of the pilot hole traces 56 such that the corner 66 moves in a direction away from the geometric center 57 of the target 55.

Referring again to FIG. 6, a trace (not shown) of the third aperture 48 is then made which is displaced from the first square 58 a distance corresponding to the distance from the line of space control superimposed on the pilot hole trace 56 to the side 26 of the pilot hole 24. As shown in FIG. 6, the trace of the third aperture 48 will be moved a distance corresponding to one line of space control.

The apparatus 21 is then rotated 90 degrees with the third aperture 48 displaced from the second square 60 a distance corresponding to the same line of space control utilized to displace the first square 58. Care must be exercised to ensure that the corner 66 moves toward the geometric center 57. the lines of space control 34 around each of the pilot holes 24 are then superimposed on the boundary of the pilot hole trace 56 and a trace (not shown) of the third aperture 48 is made. Care must be exercised to ensure that the same lines of space control are superimposed on the pilot hole traces as in the previous step. The apparatus 21 is then rotated 90 degrees and the sequence repeated to obtain a third tracing of the aperture. The apparatus is again rotated 90 degrees and a final trace is made to complete a new target having a decreased sighting area width.

The same method is used to increase the width of the sighting area, except that the lines of space control are superimposed on the boundary of the pilot hole traces such that the corner 66 moves away from the geometric centers 57 of the target.

Figure 7:
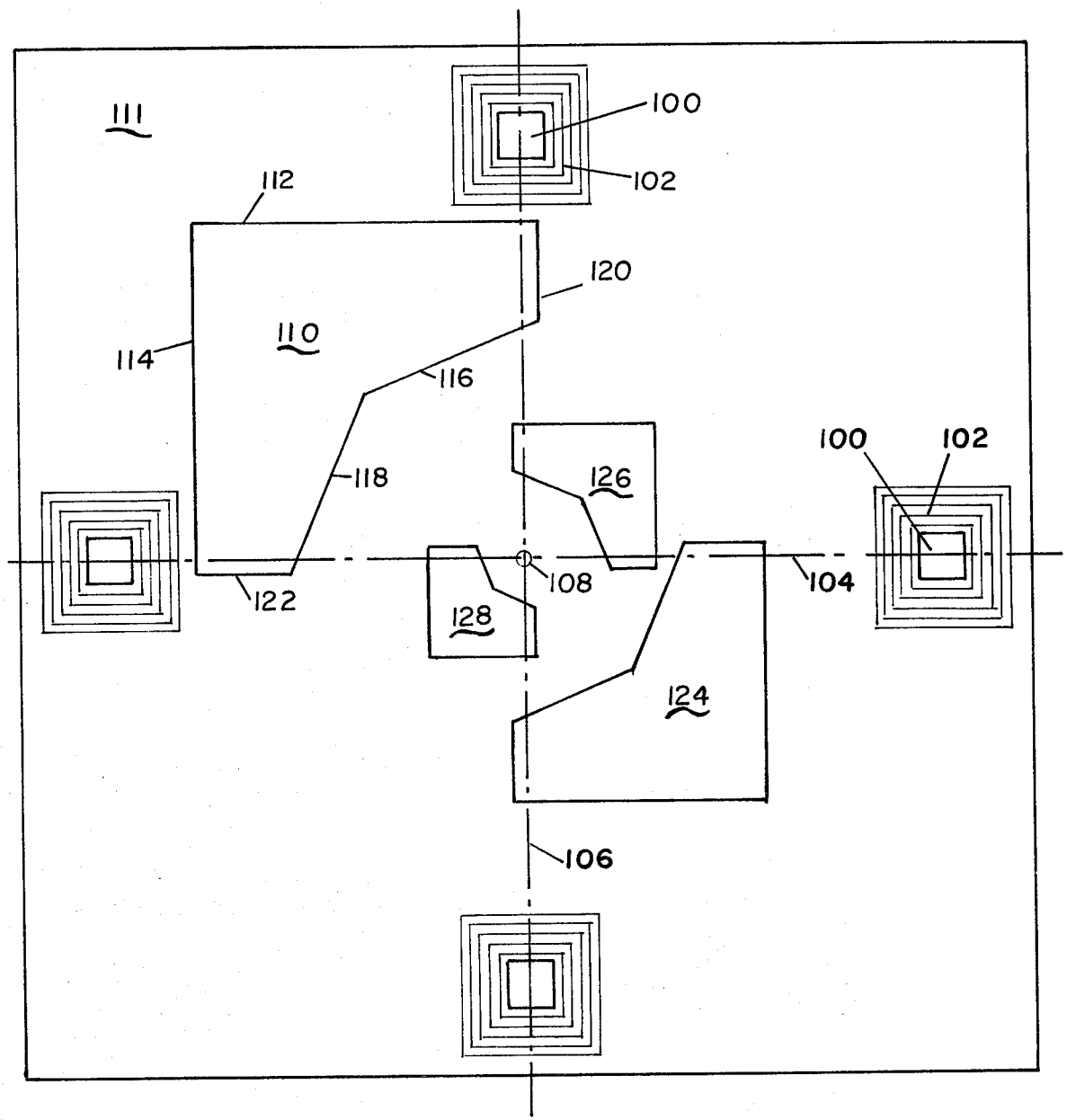
FIG. 7 shows an embodiment of the present invention.

Referring now to FIG. 7 which shows an embodiment of the present invention for the generation of targets for use with scopes having dot reticles. A pilot hole 100 with adjacent lines of space control 102 is located on and symmetric with a pair of orthogonal axis such as a horizontal axis 104 and a vertical axis 106. The pilot holes are all equidistant from the geometric center 108 of the base. A seventh aperture 110 located in the base 111 is sized to correspond to a particular dot size, for example a three inch dot. A first side 112 and a second side 114 are orthogonal to one another and are of equal length. A third side 116 and a fourth side 118 are tangent to the perimeter of a circle having its center coincident with the geometric center 108 of the base 111. A fifth side 120 is orthogonal to the first side 112 and extends to the third side 116. A sixth side 122 is orthogonal to the second side 114 and extends to the fourth side 118. An eighth aperture 124 is sized for a two inch dot, a ninth aperture 126 is sized for a one inch dot, and a tenth aperture 128 is sized for a one-half inch dot. Apertures 110, 124, 126, and 128 are all located in the base such that the smaller the aperture the shorter the distance between the aperture and the geometric center. The sides of the eigth aperture 124, the ninth aperture 126, and the tenth aperture 128 have the same relationship to one another as the sides of the seventh aperture 110 have with one another.

Figure 8:
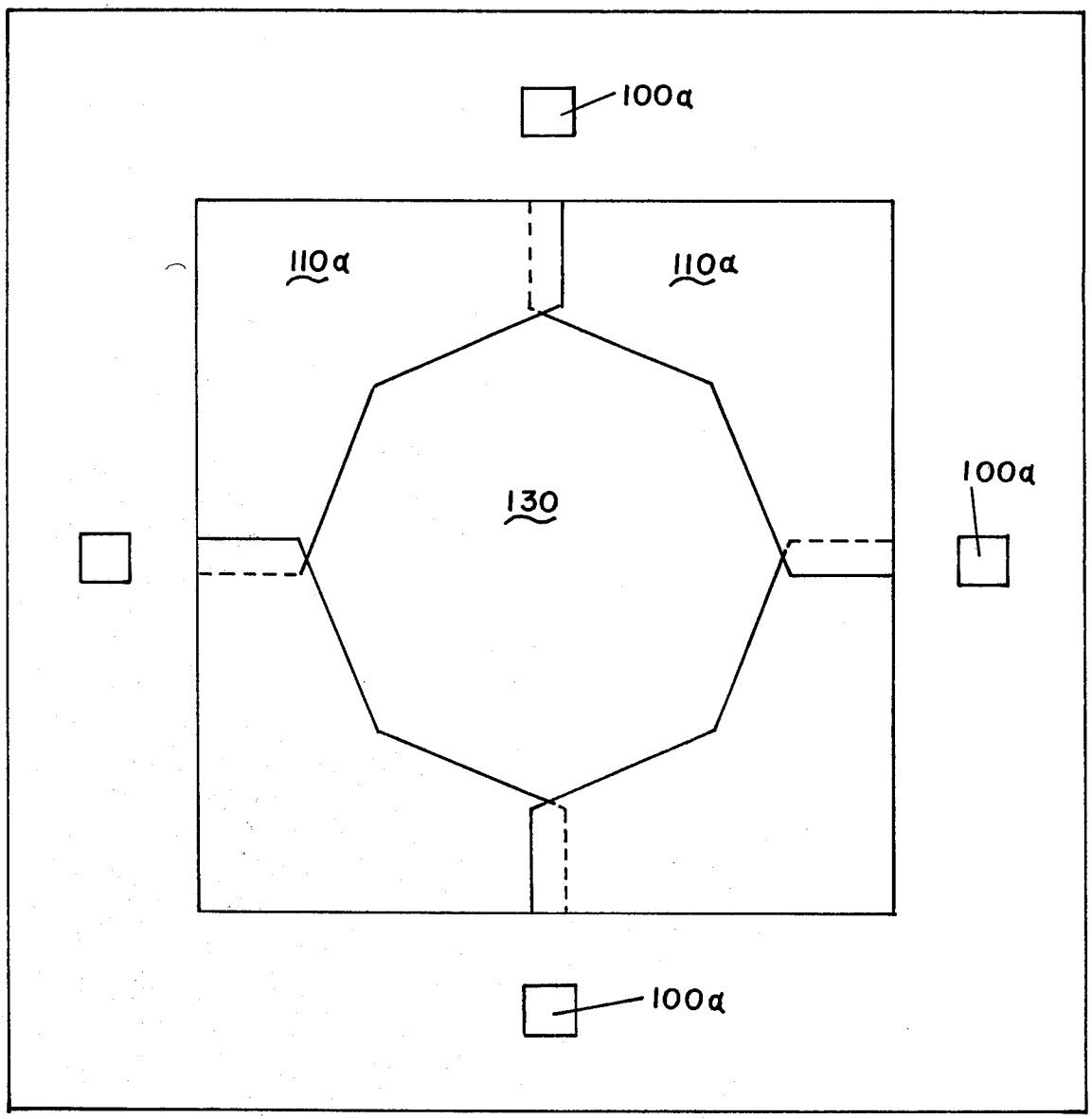
FIG. 8 shows a target generated using the embodiment shown in FIG. 7.

FIG. 8 shows a target constructed in accordance with the embodiment of the invention as shown in FIG. 7. The pilot holes are utilized in the identical manner as described in conjunction with the generation of the target as shown in FIG. 3. The pilot holes are aligned, a trace of the aperture is made, the apparatus is then rotated 90 degrees, the pilot holes are realigned and another trace of the aperture is made. The process is then continued until the target is completed. In FIG. 8, the pilot hole trace 100a, utilized only for the generation of the target, is not part of the sighting area of the target.

The sighting area 130 defines the target area. This area may be increased or decreased using the lines of space control as heretofore described. The size of the sighting area is adjusted until the perimeter of the reticle dot of the scope is superimposed on the target in close proximity to the aperture trace 110a. Optimum condition would be such that a small space exists between the superimposed dot and the aperture trace. However, in practice, the amount of spacing would depend upon the scope, the lighting conditions and the eyesight of the user.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. An apparatus for making gun targets having sighting areas optimized for a particular gun scope and gun to target distance for shot grouping comprising:

a base having a first axis and a second axis orthogonal to the first axis wherein the first axis and the second axis intersect at a geometric center of the base;

a first pilot hole located on the first axis within the base;

a second pilot hole located within the base on the second axis wherein the first and second pilot holes are located equidistant from the geometric center and are adapted for aligning the sighting areas on the gun target;

a plurality of lines of space control symmetrically disposed in a spaced apart relationship about each of the first and second pilot holes wherein the lines of space control are adapted for varying the width of the sighting area on a target to optimize the target; and an aperture within the base having a first side substantially parallel to the first axis and a second side substantially parallel to the second axis wherein the first side and the second side are located within the base equidistant from the first and and second axis respectively and the aperture is adapted for defining the sighting area on the target and has dimensions inversely proportional to the power of the gun scope.

2. An apparatus in accordance with claim 1 wherein the base is made of a transparent material.

3. An apparatus in accordance with claim 2 wherein the base has a thickness between 0.01 to 0.1 inches.

4. The apparatus in accordance with claim 1 further including a third pilot hole located within the base on the first axis equidistant with the first pilot hole from the geometric center; and a plurality of lines of space control symmetrically disposed in a space apart relationship about the third pilot hole.

5. An apparatus in accordance with claim 4 wherein the pilot holes have a rectangular shape with sides of equal length.

6. The apparatus in accordance with claim 5 further including a fourth pilot hole located within the base on the second axis equidistant with the second pilot hole from the geometric center; and
    a plurality of lines of space control symmetrically disposed in a spaced apart relationship about the fourth pilot hole.

7. An apparatus for making gun targets having sighting areas optimized for a particular gun scope and gun to target distance for shot groups comprising:
    a base having a first axis and a second axis orthogonal to the first axis wherein the first axis and the second axis intersect at a geometric center of the base;
    a plurality of apertures within the base having dimensions inversely proportional to various scope powers wherein each aperture has a first side substantially parallel to the first axis and a second side substantially parallel to the second axis wherein the first and second sides are located within the base equidistant from the first and second axis respectively and each aperture is adapted for defining a sighting area on the target;
    a pair of first pilot holes located in the base on the first axis equidistant from the geometric center;
    a pair of second pilot holes located in the base on the second axis equidistant from the geometric center wherein the distance from the geometric center to the first pilot hole is equal to the distance from the geometric center to the second pilot hole, said pilot holes adapted for aligning the sighting areas of a gun target; and
    a plurality of lines of space control symmetrically disposed in a spaced apart relationship about each of the first and second pilot holes wherein the lines of space control are adapted for varying the width of the sighting area on a target to optimize the target.

8. An apparatus for making gun targets having sighting areas optimized for a particular gun scope and gun to target distance for shot grouping comprising:
    a base having a first axis and a second axis orthogonal to the first axis wherein the first axis and the second axis intersect at a geometric center of the base;
    a plurality of apertures within the base each having different dimensions with each aperture sized to have dimensions inversely proportional to various scope powers wherein each aperture is symmetrically disposed about one of the orthogonal axis;
    a pair of first pilot holes located in the base on the first axis equidistant from the geometric center;
    a second pilot hole located in the base on the second axis wherein the distance from the geometric center to the second pilot hole is equal to the distance from the geometric center to the first pilot hole, said pilot holes adapted for aligning the sighting areas of a gun target; and
    a plurality of lines of space control symmetrically disposed in a spaced apart relationship about each of the first pilot holes and the second pilot hole wherein the lines of space control are adapted for varying the width of the sighting area on a target to optimize the target.

9. The invention in accordance with claim 8 further including a third pilot hole located in the base on the second axis equidistant with the second pilot hole from the geometric center; and
    a plurality of lines of space control symmetrically disposed in a spaced apart relationship about the third pilot hole.

10. A method for making a gun target having sighting areas optimized for a particular gun scope and gun to target distance for shot grouping comprising the steps of:
    superimposing an apparatus for making a gun target having sighting areas onto a target material;
    tracing at least three pilot holes with a marking apparatus to produce pilot hole traces onto the target material;
    selecting an appropriate aperture in the base corresponding to a particular scope power and reticle configuration;
    making a trace of the aperture to obtain a first aperture trace on the target material;
    rotating the base ninety degrees;
    realigning the pilot holes with the pilot hole traces;
    tracing the aperture to obtain a second aperture trace on the target material;
    rotating the base an additional ninety degrees, realigning the pilot holes with the pilot hole traces and tracing the aperture to obtain a third aperture trace on the target material; and
    rotating the base an additional ninety degrees, realigning the pilot holes with the pilot hole traces, and tracing the aperture to obtain a fourth aperture trace on the target material, wherein the four aperture traces define the boundaries of the sighting area on the target.

11. The method in accordance with claim 10 including coloring the aperture traces to improve the visibility of the sighting area on the target.

12. The method in accordance with claim 10 further including the steps of:
    selecting one of the lines of space control symmetrically disposed about each of the pilot holes located a distance from the sides of the pilot hole proportional to a desired reduction or increase in the size of th dimensions of the sighting area on a target;
    aligning the selected line of space control disposed about each of the pilot holes with the edge of the pilot hole traces;
    tracing the aperture to obtain a first displaced aperture trace on the target material displaced from the original trace an amount proportional to the distance of the line of space control from the side of the pilot hole;
    rotating the base ninety degrees;
    realigning the pilot hole traces with the lines of space control;
    tracing the aperture to obtain a second displaced aperture trace on the target material;
    rotating the base ninety degrees;
    realigning the pilot hole traces with the lines of space control;
    tracing the aperture to obtain a third displaced aperture trace on the target;
    rotating the base ninety degrees;
    realigning the pilot hole traces with the lines of space control;
    tracing the aperture to obtain a fourth displaced aperture trace on the target material wherein the four displaced aperture traces define a displaced sighting area having dimensions slightly varied from the original sighting area; and repeating the above steps until the dimensions of the sighting area are optimized to a particular reticle size in a gun scope.

13. A method of optimizing the sighting areas for shot grouping on a gun target comprising the steps of:

selecting a line of space control symmetrically disposed about each of the pilot holes, located a distance from the sides of the pilot hole proportional to a desired reduction or increase in the size of the dimensions of the sighting area on a target;

aligning the line of space control disposed about each of the pilot holes with the edge of the pilot hole traces;

tracing the aperture to obtain a first displaced aperture trace on the target material displaced from the original trace an amount proportional to the distance of the line of space control from the side of the pilot hole;

rotating the base ninety degrees;

realigning the pilot hole traces with the lines of space control;

tracing the aperture to obtain a second displaced aperture trace on the target material;

rotating the base ninety degrees;

realigning the pilot hole traces with the lines of space control;

tracing the aperture to obtain a third displaced aperture trace on the target material;

rotating the base ninety degrees;

realigning the pilot hole traces with the lines of space control;

tracing the aperture to obtain a fourth displaced aperture trace on the target material wherein the four displaced aperture traces define a displaced sighting area having dimensions slightly varied from the original sighting area; and repeating the above steps until the dimension of the sighting area is optimized to a particular reticle size in a gun scope.

* * * * *